Patented Aug. 20, 1935

2,011,669

UNITED STATES PATENT OFFICE 2,011,669

PHOTOGRAPHIC EMULSIONS

Walther Zehlke, Berlin, Germany, assignor to Agfa Ansco Corporation, Binghamton, N. Y., a corporation of New York No Drawing. Application May 16, 1932, Serial No. 611,756. In Germany May 20, 1931

10 Claims. (Cl. 95—7)

My present invention relates to the stabilization of light-sensitive silver halide emulsions, such as silver-halide-gelatin emulsions.

One of its objects are the new stabilized sensitive emulsion layers. Further objects will be seen from the detailed specification following hereafter.

It is known that the light-sensitive silver-halide gelatin emulsions on photographic plates, films or papers have only a limited stability. After some time there can be observed a progressive decomposition, particularly of the highly sensitive emulsions, which occurs slowly when the emulsions are kept in a cool and dry place, and more rapidly when they are kept in a moist and warm place. The effect of this decomposition is that even an unexposed emulsion, when treated with one of the usual developers, shows a more or less intense blackening or fog which extends all over the plate or film.

I have found that the stability of light-sensitive silver-halide gelatin emulsions, whether made by the ammonia or by the boiling process, is greatly improved by adding to the emulsion, either during or after its preparation, but before its application to a support, a secondary or tertiary aromatic or aromatic-aliphatic amine. The amine may be added in the form of a solution in a suitable solvent preferably a solution of about 1 per cent. Generally the addition of amine amounts to 0.005 to 0.01 per cent of the finished emulsion but it may be greater or less according to the nature of the emulsion. Suitable solvents are, for instance, the alcohols or water or mixtures thereof; there is preferably used that solvent in which the amine is most soluble.

The enhanced stability can be recognized by comparing, after a suitable treatment, photographic emulsion layers containing an addition of amine with like layers containing no such addition. According to one test the photographic plates to be investigated were kept for 24 hours in a room saturated with moisture at a temperature of 18° C., and then stored for 60 hours in a heating apparatus at a temperature of 55° C. According to another test the plates were stored under ordinary conditions. When a plate having an orthochromatic emulsion containing about 0.1 gram of diphenylamine per 1 kilo of finished emulsion was stored for twelve hours in the heating apparatus, the fog produced in the emulsion and the fog produced, during storage under the same conditions, of a plate bearing a like emulsion but containing no addition of amine were in the ratio of 2:3; after storage of the plates for 60 hours the ratio was 2:3.5. After two months storage of the plates under ordinary conditions the blackening of the plate containing the amine and that of the plate containing no amine were in the ratio of 2:4.

The following examples serve to illustrate the invention.

Example 1.—To 100 kilos of an emulsion ready for application to a support there are added 5 grams of diphenylamine dissolved in ethyl alcohol. The plates coated with this emulsion are stored under the same conditions as plates coated with a like emulsion containing no addition of diphenylamine. From the beginning of this comparative test the plates coated with the emulsion containing diphenylamine show when examined for fog a better clearness whereas the sensitiveness of both plates is the same; after some time the difference in clearness becomes more visible.

Example 2.—To 100 kilos of an emulsion ready for application to a support there are added 10 grams of triphenylamine. As in Example 1, the plates coated with emulsions containing triphenylamine have a better stability.

Example 3.—By using in Example 1, methyl-diphenylamine or phenyl-para-toluidine instead of diphenylamine and proceeding as indicated in that example, the plates coated with an emulsion containing one of the said additions have an enhanced stability.

In order to determine the fog, the plates are developed for 5 minutes in normal developer and the blackening produced is measured with the Martens sensitometer.

It is to be understood that I do not wish to limit my invention to the foregoing examples nor to the specific details given therein. The stabilizing secondary or tertiary amines may be added in any other suitable manner and the amount of solvent can be varied within wide limits. The quantity of stabilizer added likewise may be varied and a few comparative experiments should be made in order to determine the amount suitable for the special purpose in view. Numerous other embodiments are possible and I contemplate as included within my invention all such modifications and equivalents as fall within the scope of the appended claims.

Instead of using a sole secondary or tertiary aromatic amine as stabilizing addition to the photographic emulsion a mixture of such amines may be used.

What I claim is:

1. A method for stabilizing photographic silver halide emulsions which comprises dissolving diphenylamine in alcohol and adding the solution to a photographic silver halide emulsion during its preparation.

2. A method for stabilizing photographic silver halide emulsions which comprises dissolving triphenylamine in alcohol and adding the solution to a photographic silver halide emulsion during its preparation.

3. A method for stabilizing photographic silver halide emulsions which comprises dissolving methyldiphenylamine in alcohol and adding the solution to a photographic silver halide emulsion during its preparation.

4. A stabilized photographic silver halide emulsion containing diphenylamine.

5. A stabilized photographic silver halide emulsion containing triphenylamine.

6. A stabilized photographic silver halide emulsion containing methyldiphenylamine.

7. A method for stabilizing silver-halide emulsions which comprises incorporating in said emulsions, before their application to a support, a compound selected from the group consisting of diphenylamine and triphenylamine and their derivatives.

8. A method for stabilizing silver-halide emulsions which comprises dissolving a compound, selected from the group consisting of diphenylamine and triphenylamine and their derivatives, in alcohol and adding the solution to a silver-halide emulsion during its preparation.

9. A method for stabilizing silver-halide emulsions which comprises dissolving a mixture of compounds, selected from the group consisting of diphenylamine and triphenylamine and their derivatives, in alcohol and adding the solution to a silver-halide emulsion during its preparation.

10. A stabilized photographic silver-halide emulsion containing a compound selected from the group consisting of diphenylamine and triphenylamine and their derivatives.

WALTHER ZEHLKE.